(12) United States Patent
Lin et al.

(10) Patent No.: US 11,933,983 B2
(45) Date of Patent: Mar. 19, 2024

(54) VIRTUAL REALITY DISPLAY DEVICE, LENS BARREL, AND SYSTEM

(71) Applicant: Tencent Technology (Shenzhen) Company Limited, Shenzhen (CN)

(72) Inventors: Mingtian Lin, Shenzhen (CN); Chihwei Tsai, Shenzhen (CN); Zhixiong Yu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 211 days.

(21) Appl. No.: 17/331,492

(22) Filed: May 26, 2021

(65) Prior Publication Data

US 2021/0286181 A1    Sep. 16, 2021

Related U.S. Application Data

(63) Continuation of application No. 16/449,200, filed on Jun. 21, 2019, which is a continuation of application No. PCT/CN2018/079760, filed on Mar. 21, 2018.

(30) Foreign Application Priority Data

Mar. 28, 2017    (CN) .......................... 201710193045.9

(51) Int. Cl.
*G02B 27/01*    (2006.01)
*G02B 1/04*    (2006.01)

(52) U.S. Cl.
CPC .......... *G02B 27/0172* (2013.01); *G02B 1/041* (2013.01); *G02B 27/01* (2013.01); *G02B 27/0176* (2013.01); *G02B 2027/0134* (2013.01)

(58) Field of Classification Search
CPC ...................... G02B 27/0172; G02B 27/0176; G02B 27/01; G02B 1/041; G02B 2027/0134; G02B 2027/0178
See application file for complete search history.

(56) References Cited

U.S. PATENT DOCUMENTS 6,329,965 B1    12/2001 Lee

FOREIGN PATENT DOCUMENTS

| CN | 1470898 A | 1/2004 |
| CN | 101578755 A | 11/2009 |
| (Continued) | | |

OTHER PUBLICATIONS

WO-2018094881-A1, translation (Year: 2018).*

(Continued)

*Primary Examiner* — Wen Huang
(74) *Attorney, Agent, or Firm* — Morgan, Lewis & Bockius LLP

(57) ABSTRACT

Embodiments of this application relate to a virtual reality display device. The virtual reality display device includes a left lens barrel and a right lens barrel; the left lens barrel includes: a left lens barrel housing, a left display screen, and a left lens; the right lens barrel includes: a right lens barrel housing, a right display screen, and a right lens; an inner side of an opening portion of the left lens barrel housing includes a left lens holder; an inner side of an opening portion of the right lens barrel housing includes a right lens holder; a left fill layer is provided between the left lens holder and the left lens; and a right fill layer is provided between the right lens holder and the right lens.

11 Claims, 12 Drawing Sheets

(56) References Cited

FOREIGN PATENT DOCUMENTS

| CN | 101799585 | A | | 8/2010 |
|---|---|---|---|---|
| CN | 103487938 | A | | 1/2014 |
| CN | 104570355 | A | | 4/2015 |
| CN | 104808342 | A | | 7/2015 |
| CN | 104932103 | A | | 9/2015 |
| CN | 105093482 | A | | 11/2015 |
| CN | 106019600 | A | | 10/2016 |
| CN | 205899141 | U | * | 1/2017 |
| CN | 106405833 | A | | 2/2017 |
| WO | WO-2018094881 | A1 | * | 5/2018 |

OTHER PUBLICATIONS

CN-205899141-U, translation (Year: 2017).*
Tencent Technology, ISRWO, PCT/CN2018/079760, Jun. 19, 2018, 6 pgs.
Tencent Technology, IPRP, PCT/CN2018/079760, Oct. 1, 2019, 5 pgs.

* cited by examiner

VIRTUAL REALITY DISPLAY DEVICE, LENS BARREL, AND SYSTEM

CROSS-REFERENCE TO RELATED APPLICATIONS

This application is a continuation application of U.S. patent application Ser. No. 16/449,200, entitled "VIRTUAL REALITY DISPLAY DEVICE, LENS BARREL, AND SYSTEM" filed on Jun. 21, 2019, which is a continuation application of PCT/CN2018/079760, entitled "VIRTUAL REALITY DISPLAY DEVICE, LENS BARREL, AND SYSTEM" filed on Mar. 21, 2018, which claims priority to Chinese Patent Application No. 201710193045.9, filed with the Chinese Patent Office on Mar. 28, 2017 and entitled "VIRTUAL REALITY DISPLAY DEVICE, LENS BARREL, AND SYSTEM", all of which are incorporated by reference in their entirety.

FIELD OF THE TECHNOLOGY

This application relates to the field of virtual reality (VR), and in particular, to a virtual reality display device, lens barrel, and system.

BACKGROUND OF THE DISCLOSURE

The virtual reality technology is a stimulation technology for generating, by using a VR system, an interactive three-dimensional visual scene and physical behaviors mixed with multi-source information.

In the VR technology, a presentation manner for the three-dimensional visual scene is usually as follows: A virtual reality display device in the VR system is provided with a left lens barrel and a right lens barrel, which respectively correspond to the left eye and the right eye of a user. Each lens barrel is provided with a display screen and at least one lens, and display screens in the left and right lens barrels display different content. The eyes of the user can observe virtual images displayed on the display screens through the lenses, and the different virtual images observed by the eyes of the user emerge together and form a three-dimensional visual scene.

In the virtual reality display device, a distance between a virtual image displayed on a display screen and an eye of a user is referred to as a virtual image distance (VID), and a distance between a display screen and a lens is referred to as a back focus length (Back Focus Length, BFL). The VID of a lens barrel is in positive correlation with the BFL, to be specific, a larger BFL indicates a larger VID.

SUMMARY

An embodiment of this application provides a virtual reality display device. The virtual reality display device includes a left lens barrel and a right lens barrel.

The left lens barrel includes a left lens barrel housing, a left display screen, and a left lens; and the right lens barrel includes: a right lens barrel housing, a right display screen, and a right lens.

An inner side of an opening portion of the left lens barrel housing includes a left lens holder, the left display screen is mounted at the bottom of the left lens barrel housing, the left lens is mounted on a side of the left lens holder close to the opening portion of the left lens barrel housing, and the left display screen is parallel to the left lens.

An inner side of an opening portion of the right lens barrel housing includes a right lens holder, the right display screen is mounted at the bottom of the right lens barrel housing, the right lens is mounted on a side of the right lens holder close to the opening portion of the right lens barrel housing, and the right display screen is parallel to the right lens.

A left fill layer is provided between the left lens holder and the left lens, and the left lens holder, the left fill layer, and the left lens are adhered together consecutively; and a right fill layer is provided between the right lens holder and the right lens, and the right lens holder, the right fill layer, and the right lens are adhered together consecutively.

The thickness of the left fill layer is a difference between a preset target distance and a first distance, the thickness of the right fill layer is a difference between the target distance and a second distance, the first distance is a distance between a surface of the left lens holder close to the opening portion of the left lens barrel housing and the left display screen, and the second distance is a distance between a surface of the right lens holder close to the opening portion of the right lens barrel housing and the right display screen.

An embodiment of this application provides a virtual reality display device. The virtual reality display device includes a left lens barrel and a right lens barrel.

The left lens barrel includes a left lens barrel housing, a left display screen, and a left lens; and the right lens barrel includes: a right lens barrel housing, a right display screen, and a right lens.

An inner side of an opening portion of the left lens barrel housing includes a left lens holder, the left display screen is mounted at the bottom of the left lens barrel housing, the left lens is mounted on a side of the left lens holder close to the opening portion of the left lens barrel housing, and the left display screen is parallel to the left lens.

An inner side of an opening portion of the right lens barrel housing includes a right lens holder, the right display screen is mounted at the bottom of the right lens barrel housing, the right lens is mounted on a side of the right lens holder close to the opening portion of the right lens barrel housing, and the right display screen is parallel to the right lens.

A left fill layer is provided between the bottom of the left lens barrel housing and the left display screen, and the left lens barrel housing, the left fill layer, and the left display screen are adhered together consecutively; and a right fill layer is provided between the bottom of the right lens barrel housing and the right display screen, and the right lens barrel housing, the right fill layer, and the right display screen are adhered together consecutively.

A sum of the thickness of the left fill layer and the thickness of the left display screen is a difference between a first distance and a target distance, a sum of the thickness of the right fill layer and the thickness of the right display screen is a difference between a second distance and the target distance, the first distance is a distance between the left lens and the bottom of the left lens barrel housing, and the second distance is a distance between the right lens and the bottom of the right lens barrel housing.

An embodiment of this application provides a lens barrel of a virtual reality display device. The lens barrel includes: a lens barrel housing, a display screen, and a lens.

An inner side of an opening portion of the lens barrel housing includes a lens holder, the display screen is mounted at the bottom of the lens barrel housing, the lens is mounted on a side of the lens holder close to the opening portion of the lens barrel housing, and the display screen is parallel to the lens.

A fill layer is provided between the lens holder and the lens, and the lens holder, the fill layer, and the lens are adhered together consecutively.

The thickness of the fill layer is a difference between a target distance and a first distance, and the first distance is a distance between a surface of the lens holder close to the opening portion of the lens barrel housing and the display screen.

An embodiment of this application further provides a lens barrel of a virtual reality display device. The lens barrel includes: a lens barrel housing, a display screen, and a lens.

An inner side of an opening portion of the lens barrel housing includes a lens holder, the display screen is mounted at the bottom of the lens barrel housing, the lens is mounted on a side of the lens holder close to the opening portion of the lens barrel housing, and the display screen is parallel to the lens.

A fill layer is provided between the bottom of the lens barrel housing and the display screen, and the lens barrel housing, the fill layer, and the display screen are adhered together consecutively.

A sum of the thickness of the fill layer and the thickness of the display screen is a difference between a first distance and a target distance, and the first distance is a distance between the lens and the bottom of the lens barrel housing.

An embodiment of this application further provides a virtual reality system. The virtual reality system includes:

the virtual reality display device according to the embodiments of this application.

BRIEF DESCRIPTION OF THE DRAWINGS

The accompanying drawings herein are incorporated in and constitute a part of the specification, illustrate embodiments of this application, and are used to explain the principle of this application together with the specification.

DESCRIPTION OF EMBODIMENTS

Exemplary embodiments are described in detail herein, and examples of the exemplary embodiments are shown in the accompanying drawings. When the following descriptions relate to the accompanying drawings, unless indicated otherwise, same numbers in different accompanying drawings represent same or similar elements. The implementations described in the following exemplary embodiments do not represent all implementations consistent with this application. On the contrary, the implementations are merely examples of apparatuses and methods that are described in detail in the appended claims and that are consistent with some aspects of this application.

Figure 1:
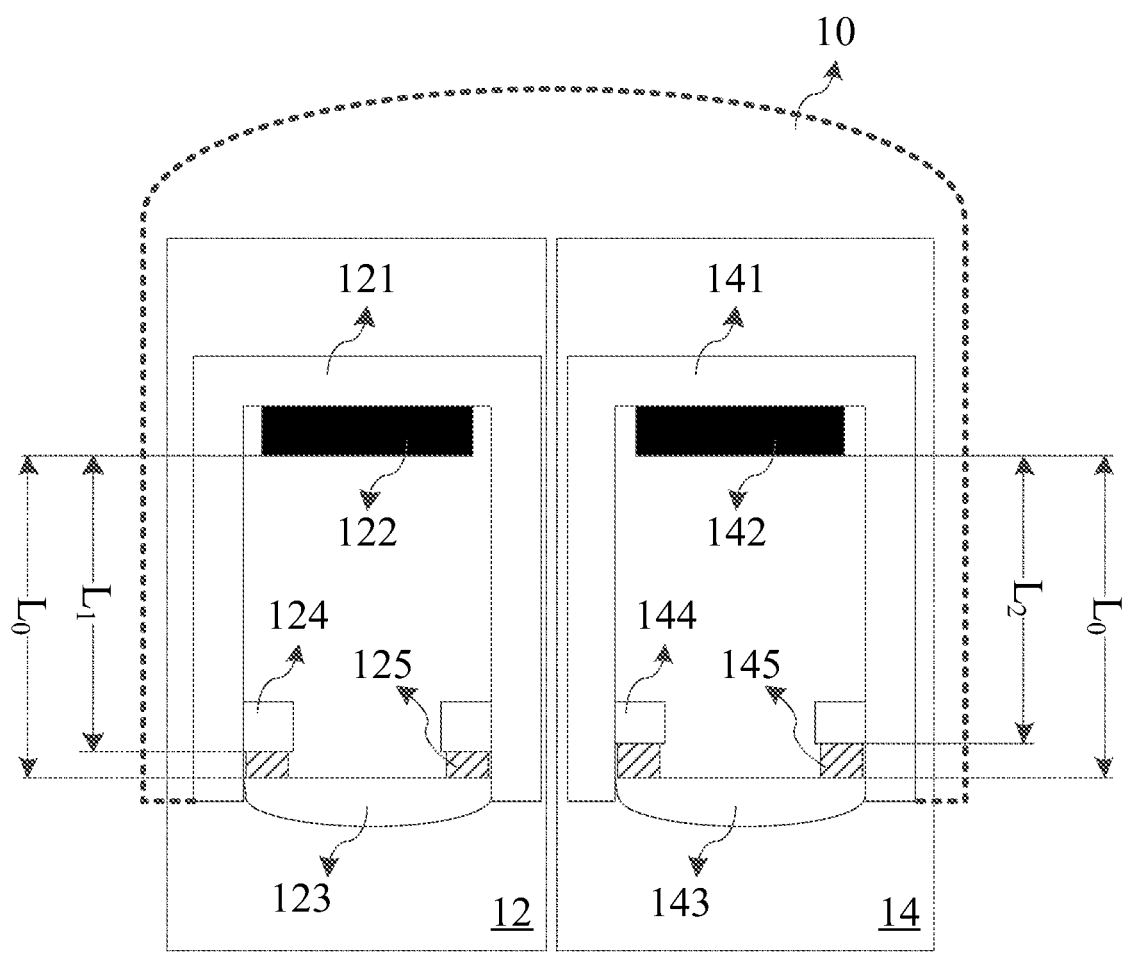
FIG. 1 shows a schematic structural diagram of a virtual reality display device according to an embodiment of this application.

FIG. 1 shows a schematic structural diagram of a virtual reality display device according to an embodiment of this application. The virtual reality display device 10 includes: a left lens barrel 12 and a right lens barrel 14.

The virtual reality display device 10 is a device worn by a user in front of eyes to display images. The virtual reality display device 10 generally includes a wearing portion and a display portion. The wearing portion includes temples, an elastic band, and the like that are configured to wear the virtual reality display device 10 on the head of a user. The display portion includes a left lens barrel 12 and a right lens barrel 14. The virtual reality display device 10 can display different images through the left lens barrel 12 and the right lens barrel 14, to present a three-dimensional visual scene to the user.

The left lens barrel 12 includes: a left lens barrel housing 121, a left display screen 122, and a left lens 123. The right lens barrel 14 includes: a right lens barrel housing 141, a right display screen 142, and a right lens 143.

An inner side of an opening portion of the left lens barrel housing 121 includes a left lens holder 124. An inner side of an opening portion of the right lens barrel housing 141 includes a right lens holder 144.

The left lens holder 124 and the left lens barrel housing 121 may be two independent components that are fixedly connected to each other; or the left lens holder 124 and the left lens barrel housing 121 may be integrated, for example, the left lens holder 124 may be a part of the left lens barrel housing 121 extending to the inner side, or the left lens holder 124 may be formed by outward recess of the left lens barrel housing 121.

Similarly, the right lens holder 144 and the right lens barrel housing 141 may be two independent components that are fixedly connected to each other; or the right lens holder 144 and the right lens barrel housing 141 may be integrated, that is, the right lens holder 144 may be a part of the right lens barrel housing 141 extending to the inner side; or the right lens holder 144 may be formed by outward recess of the right lens barrel housing 141.

Figure 2:
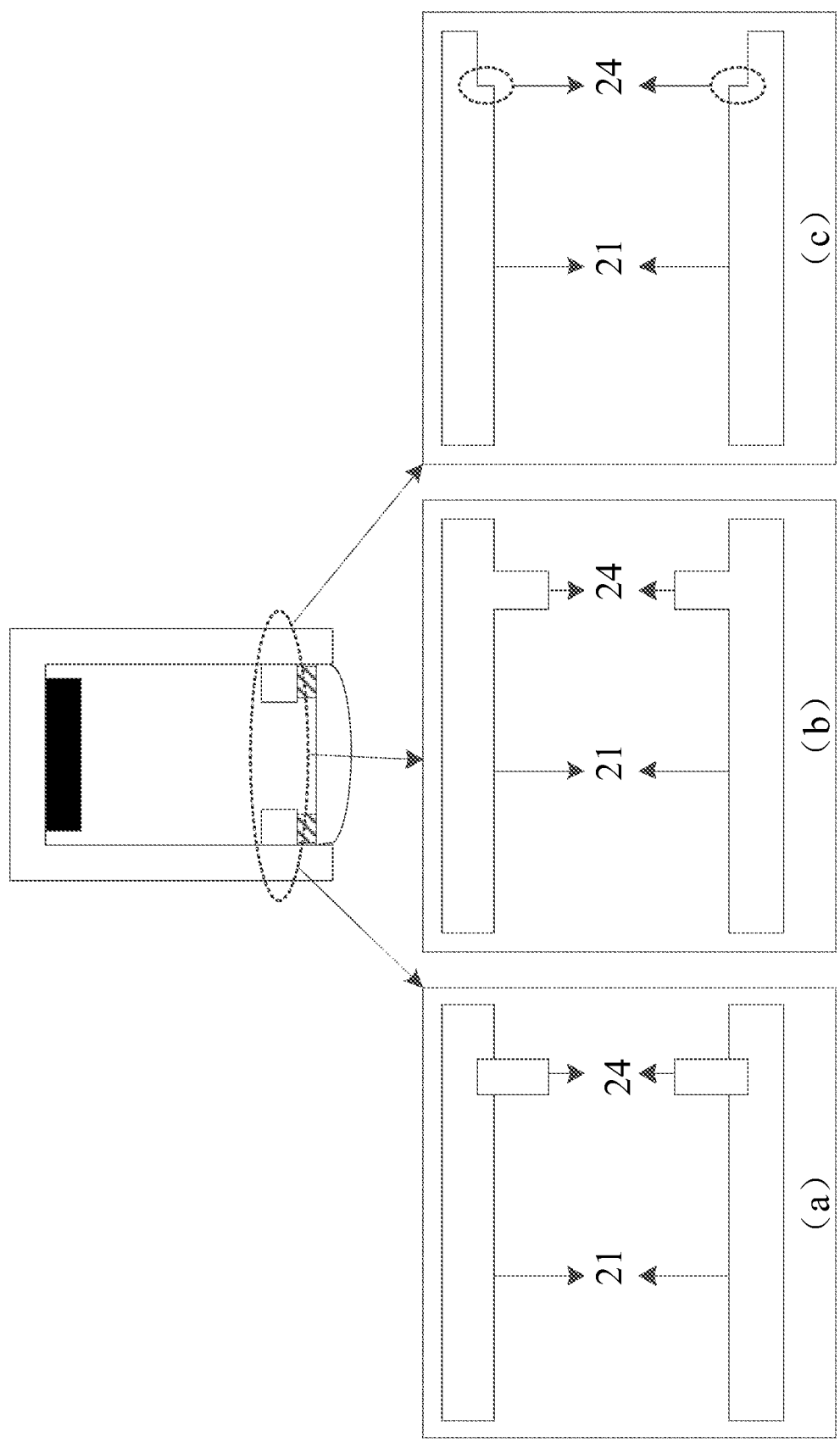
FIG. 2 shows a side cross-sectional view of a lens holder according to an embodiment shown in FIG. 1.

For example, FIG. 2 is a side cross-sectional view of the lens holder according to this embodiment of this application. In FIG. 2, FIG. (a) at the lower left portion represents that lens holders 24 and lens barrel housings 21 are of split structures, and the lens holders 24 are mounted in grooves on inner sides of the lens barrel housings 21. FIG. (b) at the lower middle portion represents that the lens holders 24 and the lens barrel housings 21 are of integrated structures, and the lens holders 24 are formed by the inner sides of the lens barrel housings 21 by protruding towards the center. FIG. (c)

at the lower right portion represents that the lens holders 24 and the lens barrel housings 21 are of integrated structures, and the lens holders 24 are formed by the inner sides of the lens barrel housings 21 by recessing towards edges.

In some embodiments, the left lens holder 124 and the right lens holder 144 are consecutive holder bands surrounding inner sides of respective corresponding lens barrel housings, or the left lens holder 124 and the right lens holder 144 each include several non-consecutive sub-holders surrounding inner sides of respective corresponding lens barrel housings.

Figure 3:
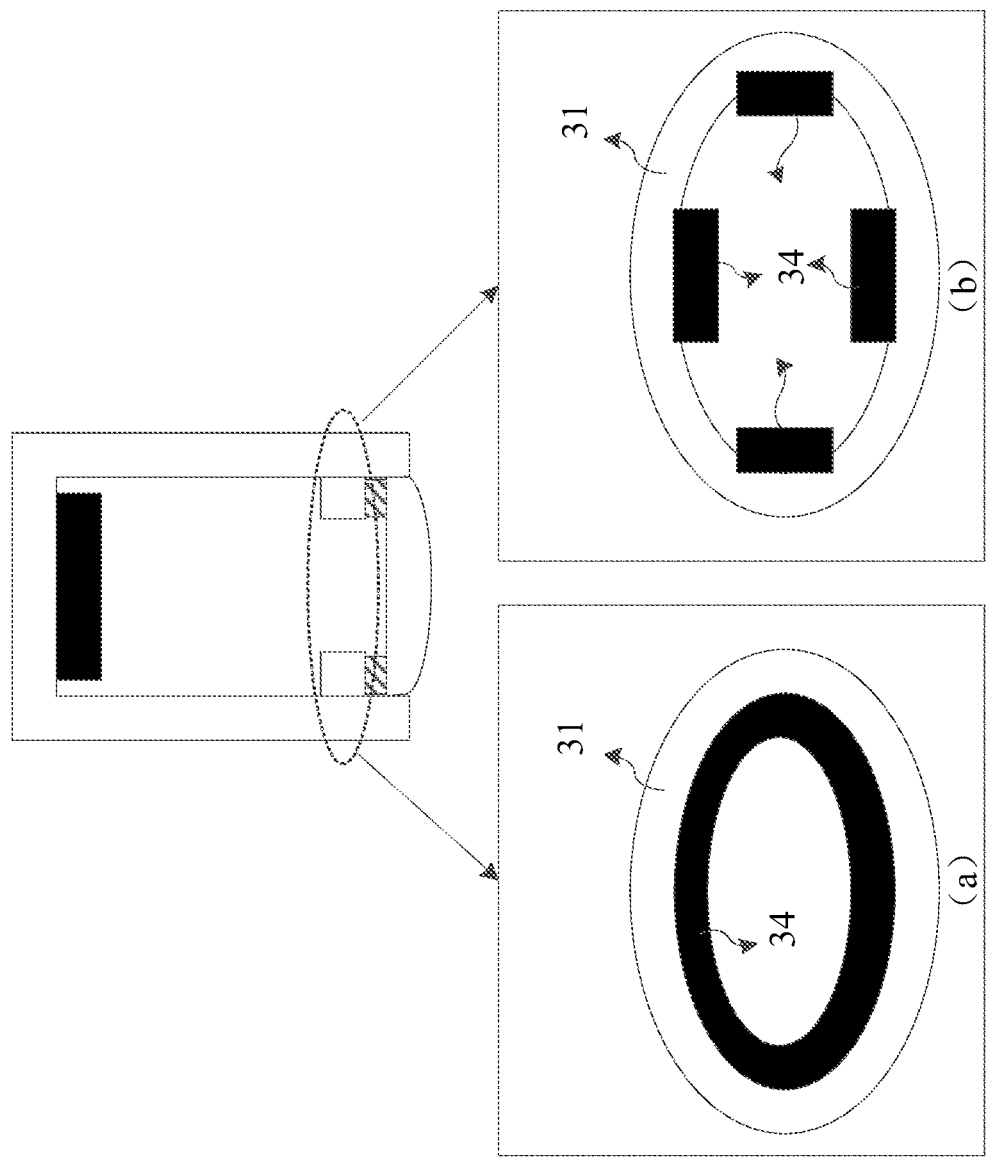
FIG. 3 shows a top view of a lens holder according to the embodiment shown in FIG. 1.

For example, FIG. 3 is a top view of the lens holder according to this embodiment of this application. In FIG. 3, FIG. (a) at the lower left portion represents that a lens holder 34 is consecutively disposed around an inner side of a lens barrel housing 31 by one circle. FIG. (b) at the lower right portion represents that the lens holder 34 is non-consecutively disposed around the inner side of the lens barrel housing 31 by one circle.

In FIG. 1, the left display screen 122 is mounted on an inner side of the left lens holder 124, and is close to the bottom of the left lens barrel housing 121, the left lens 123 is mounted on an outer side (that is, on a side close to the opening portion of the left lens barrel housing 121) of the left lens holder 124, and the left display screen 122 is parallel to the left lens 124; correspondingly, the right display screen 142 is mounted on an inner side of the right lens holder 144, and is close to the bottom of the right lens barrel housing 141, the right lens 143 is mounted on an outer side (that is, a side close to the opening portion of the left lens barrel housing 141) of the right lens holder 144, and the right display screen 142 is parallel to the right lens 143.

In this embodiment of this application, the display screen may be fixedly disposed at the bottom of the lens barrel housing, the lens is mounted at the opening portion of the lens barrel housing, and the lens holder is configured to hold the lens.

In FIG. 1, a left fill layer 125 is provided between the left lens holder 124 and the left lens 123, and the left lens holder 124, the left fill layer 125, and the left lens 123 are adhered together consecutively; and correspondingly, a right fill layer 145 is provided between the right lens holder 144 and the right lens 143, and the right lens holder 144, the right fill layer 145, and the right lens 143 are adhered together consecutively.

The thickness of the left fill layer 125 is a difference between a target distance $L_0$ and a first distance $L_1$. The thickness of the right fill layer 145 is a difference between the target distance $L_0$ and a second distance $L_2$. The first distance $L_1$ is a distance between a surface of the left lens holder 124 close to the opening portion of the left lens barrel housing 121 and the left display screen 122. The second distance $L_2$ is a distance between a surface of the right lens holder 144 close to the opening portion of the right lens barrel housing 141 and the right display screen 142. It should be noted that the target distance $L_0$ is determined according to a preset virtual image distance. The virtual image distance is a distance between a virtual image displayed on a display screen and an eye of a user, and is a preset value that is set according to a specific virtual reality scenario, for example, 1 meter or 2 meters.

In this embodiment of this application, the left fill layer 125 is configured to adjust a distance between the left display screen 122 and the left lens 123 to the target distance $L_0$, and the right fill layer 145 is configured to adjust a distance between the right display screen 142 and the right lens 143 to the same target distance $L_0$. After being filled by the fill layer, the distances between the display screens in the left and right lens barrels and the lenses are approximately the same target distance.

The thickness of a fill layer is set according to a distance between a display screen and an upper surface of a lens holder after the display screen has been mounted. Specifically, the thickness of the fill layer is a difference between a distance from the display screen to the upper surface of the lens holder and a standard BFL (that is, the target distance).

Correspondingly, for the virtual reality display device 10 in FIG. 1, the left fill layer 125 and the right fill layer 145 may have the same thickness or may have different thicknesses.

Specifically, when the display screen of the left and right lens barrels have the same distance to the upper surfaces of the lens holders, the left fill layer 125 and the right fill layer 145 also have the same thickness. When the display screen of the left and right lens barrels have different distances to the upper surfaces of the lens holders, the left fill layer 125 and the right fill layer 145 also have the different thicknesses.

In actual application, mass-produced components may have a tolerance (that is, an allowed change in an actual parameter) due to insufficient preciseness or the like. Specifically, for example, distances between bottoms of lens holders and mounting positions (for example, the bottoms on the inner sides of the lens barrel housings in FIG. 1) of display screens may have a tolerance, the thicknesses of the lens holders may have a tolerance, and the thicknesses of the display screens may have a tolerance. In a mounting process, the mounting preciseness also has a tolerance. The tolerances of all the foregoing components are superposed. If the fill layers are not provided and the lenses are directly mounted on the lens holders, BFLs of the two lens barrels differ a lot, and the difference between the BFLs of the left and right lens barrels causes an even larger difference between VIDs of the two lens barrels. For example, it is assumed that a tolerance obtained by superposing tolerances of all components of a lens barrel may reach ±0.35 mm. Table 1 shows a correspondence between a BFL and a VID of the lens barrel (a unit of the numbers in the table is millimeter).

TABLE 1

|     | BFL +0.35 | BFL +0.2 | BFL +0.1 | BFL  | BFL −0.1 | BFL −0.2 | BFL −0.35 |
|-----|-----------|----------|----------|------|----------|----------|-----------|
| BFL | 41.75     | 41.60    | 41.50    | 41.40 | 41.30   | 41.20    | 41.05     |
| VID | 1300      | 1120     | 1060     | 1000 | 950      | 900      | 820       |

As shown in Table 1, in an alternative case, for a virtual reality display device, when a tolerance between a BFL of one lens barrel of the virtual reality display device and a standard BFL reaches +0.35 mm in total, and a tolerance of a BFL of the other lens barrel and the standard BFL reaches −0.35 mm in total, a difference between VIDs of the two lens barrels may reach 1300−820=480 (mm). However, a VID in the standard BFL is only 1000 mm. In this case, a distance difference between virtual images observed by the left eye and the right eye reaches 480 mm. In this case, a user may not be able to clearly see a three-dimensional visual scene generated by superposing two virtual images. This is unacceptable for use of the virtual reality display device. In addition, even if the difference between the VIDs of the two lens barrels allows the user to clearly see the three-dimensional visual scene generated by superposing the two virtual images, it easily causes fatigue of the eyes of the user, and such a virtual reality display device is not suitable for long term use.

In the virtual reality display device in this embodiment of this application, a fill layer arranged according to a tolerance and a mounting preciseness tolerance of actual components is disposed between the lens holder and the lens, so that a distance (that is, the BFL) between the mounted display screen and the lens is as close to the target distance (that is, the standard BFL) as possible, VIDs of virtual images finally displayed in different lens barrels remain consistent, and the user sees more clearly a three-dimensional visual scene generated by superposing virtual images, thereby improving the display effect of the three-dimensional visual scene in virtual reality.

Figure 4:
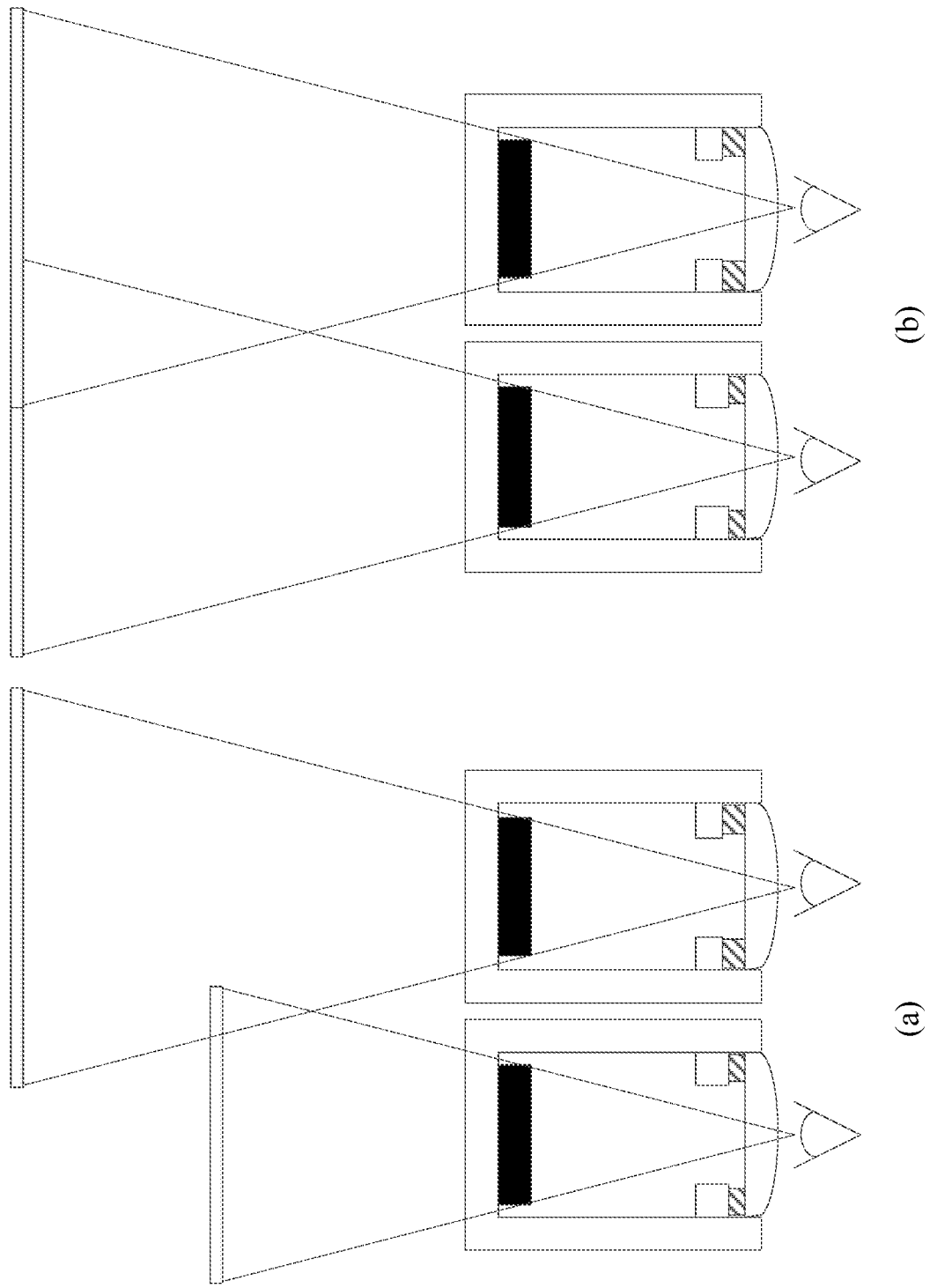
FIG. 4 shows a comparison diagram of virtual image display according to the embodiment shown in FIG. 1.

Specifically, for example, FIG. 4 is a comparison diagram of virtual image display according to an embodiment of this application. In FIG. 4, FIG. (a) on the left side is a schematic diagram of virtual image display when no fill layer is provided between lens holders and lenses. In this case, due to existence of a tolerance of components of a left lens barrel and a right lens barrel and a tolerance of assembly technologies, BFLs of the left lens barrel and the right lens barrel may differ a lot. Consequently, VIDs of virtual images displayed in the left lens barrel and the right lens barrel also differ a lot, and the display effect is poor. FIG. (b) on the right side is a schematic diagram of virtual image display when fill layers are provided between lens holders and lenses. In this case, a tolerance of components of a left lens barrel and a right lens barrel and a tolerance of assembly technologies are adjusted by the fill layers, BFLs of the left lens barrel and the right lens barrel differ a little. Therefore, VIDs of virtual images presented in the left lens barrel and the right lens barrel are approximately the same. In this case, the virtual images displayed in the two lens barrels can be more easily superposed and emerged, and the display effect is better.

In some embodiments, the left fill layer 124 and/or the right fill layer 144 is a pad.

In this embodiment of this application, the fill layer between the lens holder and the lens may be a pad, and the pad may be made of a material such as metal or rubber. The pad is respectively adhered to the lens holder and the lens by using a curing adhesive or a double faced adhesive tape.

In some embodiments, the pad includes at least one sub-pad having a fixed thickness.

In actual application, because tolerances of components in different lens barrels are inconsistent, the thicknesses of pads of the lens barrels are also inconsistent. If pad having different thicknesses are produced for different lens barrels, the production process and the assembly process are both relatively complex, and the assembly difficulty is relatively high. In this embodiment of this application, the pad in each lens barrel may include relatively thin sub-pads having a fixed thickness. For different lens barrels, during assembly, a corresponding quantity of sub-pads may be selected according to a required thickness to form a pad configured to fill between the lens and the lens holder.

For example, an example in which a tolerance obtained by superposing tolerances of all the components of the foregoing lens barrel may reach ±0.35 mm is used. It may be set that each sub-pad has a thickness of 0.05 mm. In an actual assembly process, if a required thickness is approximately 0.05 mm, one sub-pad may be selected to form the foregoing pad; or if a required thickness is approximately 0.1 mm, two sub-pads may be stacked to form the foregoing pad, and the rest can be deduced by analogy.

Figure 5:
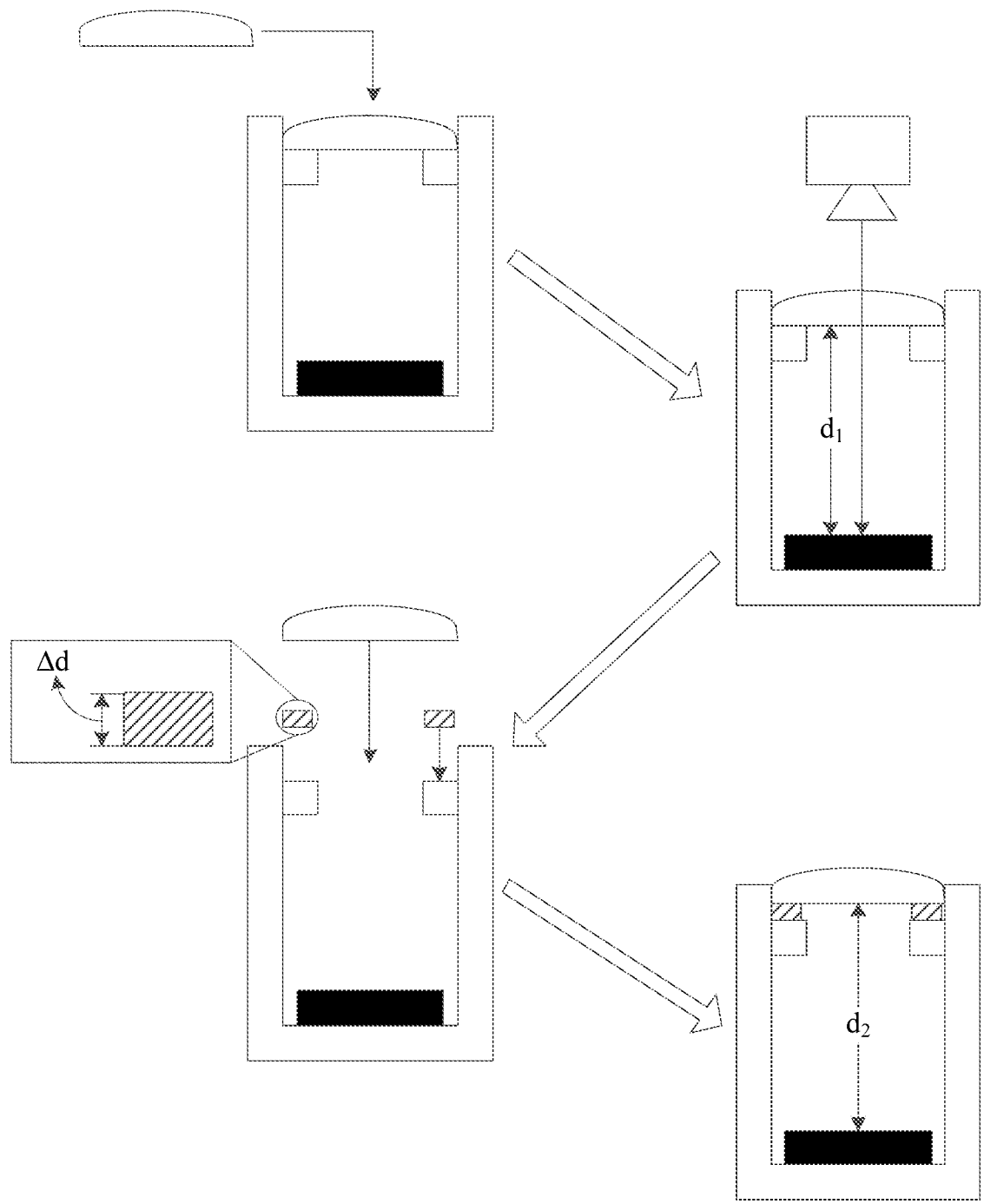
FIG. 5 shows a schematic diagram of an assembly procedure of a lens barrel according to the embodiment shown in FIG. 1.

For example, FIG. 5 is a schematic diagram of an assembly procedure of a lens barrel according to an embodiment of this application. The assembly procedure is a procedure of mounting a lens after a display screen has been mounted. Referring to FIG. 5, the procedure may be as follows:

Step 5a. After a display screen is mounted at the bottom of a lens barrel housing of a device, control a first mechanical component to place a lens on an outer side of a lens holder and keep the lens clinging to the lens holder.

When the lens is assembled, the assembly device may not fill a pad first, but directly place the lens on the lens holder. For example, a controller in the assembly device may control the first mechanical component (for example, a mechanical arm capable of grasping the lens) to grasp the lens, and put the lens on the lens holder.

In some embodiments, the lens is not fixed to the lens holder. To prevent the lens from dropping, during assembly, the assembly device may fixedly place the lens barrel with the bottom facing downward and the top facing upward.

Step 5b. An image acquisition unit measures, through the lens, a virtual image distance between a virtual image displayed on the display screen and the image acquisition unit.

Specifically, the image acquisition unit may be a camera. A focal length of the camera and a virtual image distance (VID) that is captured by the camera are pre-calibrated, in other words, the assembly device stores a correspondence between distances of the focal length of the camera and the VID.

In an assembly process, the display screen of the lens barrel displays a virtual image, the assembly device controls the camera to move to a predetermined position in front of the lens, the virtual image displayed on the display screen is focused through the lens, and after the focus is completed (that is, the virtual image acquired at this time is the clearest), the VID before the pad is filled can be determined according to a current focal length and the foregoing pre-stored correspondence between the focal length and the VID.

Step 5c. Determine a pre-fill distance $d_1$ between the display screen and the lens according to a virtual image distance VID, and calculate a distance difference $\Delta d$ between the pre-fill distance and a target distance $d_z$.

When specifications of a display screen and a lens of a lens product are fixed, a relationship between a distance (that is, a BFL) from the display screen to the lens of the lens product and a virtual image distance (VID) is also fixed. In this embodiment of this application, the assembly device may store a pre-calibrated correspondence (for example, the correspondence shown in Table 1) between each BFL and each VID. In step 5c, after the VID is determined through query before the pad is filled, the pre-fill distance $d_1$ between the corresponding display screen and lens may be directly queried, and the distance difference $\Delta d$ between the pre-fill distance and the target distance $d_2$ is calculated.

Step 5d. Control a second mechanical component to fill, between an outer side of the lens holder and the lens, a pad having a thickness of the distance difference.

In this embodiment of this application, several sub-pads having a fixed thickness may be preset, and each sub-pad has a relatively thin thickness (relative to the foregoing distance difference). When the pad is filled, the controller may calculate a quantity of required sub-pads according to the foregoing distance difference. For example, after the distance difference is divided by a sub-pad thickness, rounding up is performed, and an obtained integer is the quantity of sub-pads. Subsequently, the controller controls the first mechanical component to move away the lens, controls the second mechanical component to grasp the corresponding quantity of sub-pads and fill the grasped sub-pads onto the lens holder, and then controls the first mechanical component to place the lens on the pad. Finally, the lens holder, the pad, and the lens are fixed by using a binder such as a double faced adhesive tape or a curing adhesive.

In some embodiments, before the lens holder, the pad, and the lens are adhered and fixed, the controller may further measure, by using the image acquisition unit, a VID obtained after the pad is filled. If the VID obtained after the pad is filled satisfies a requirement, for example, an error between the VID and a target VID is within an allowed range, an operation of fixing the lens holder, the pad, and the lens is performed; otherwise, a quantity of sub-pads is increased or decreased according to a measurement result, till a VID obtained after the pad is filled satisfies the requirement.

In some embodiments, the first mechanical component and the second mechanical component may be the same mechanical component or may be different mechanical components.

In some embodiments, the left fill layer 124 and/or the right fill layer 144 is a curing adhesive.

In another possible implementation, alternatively, a curing adhesive may be used as a fill layer. The curing adhesive is liquid in an initial state. The liquid curing adhesive may be solidified into a solid curing adhesive in some particular conditions. In this embodiment of this application, the curing adhesive may be an ultraviolet curing adhesive or a moisture curing adhesive.

In some embodiments, the curing adhesive may alternatively be another type of curing adhesive, for example, a visible light curing adhesive.

Figure 6:
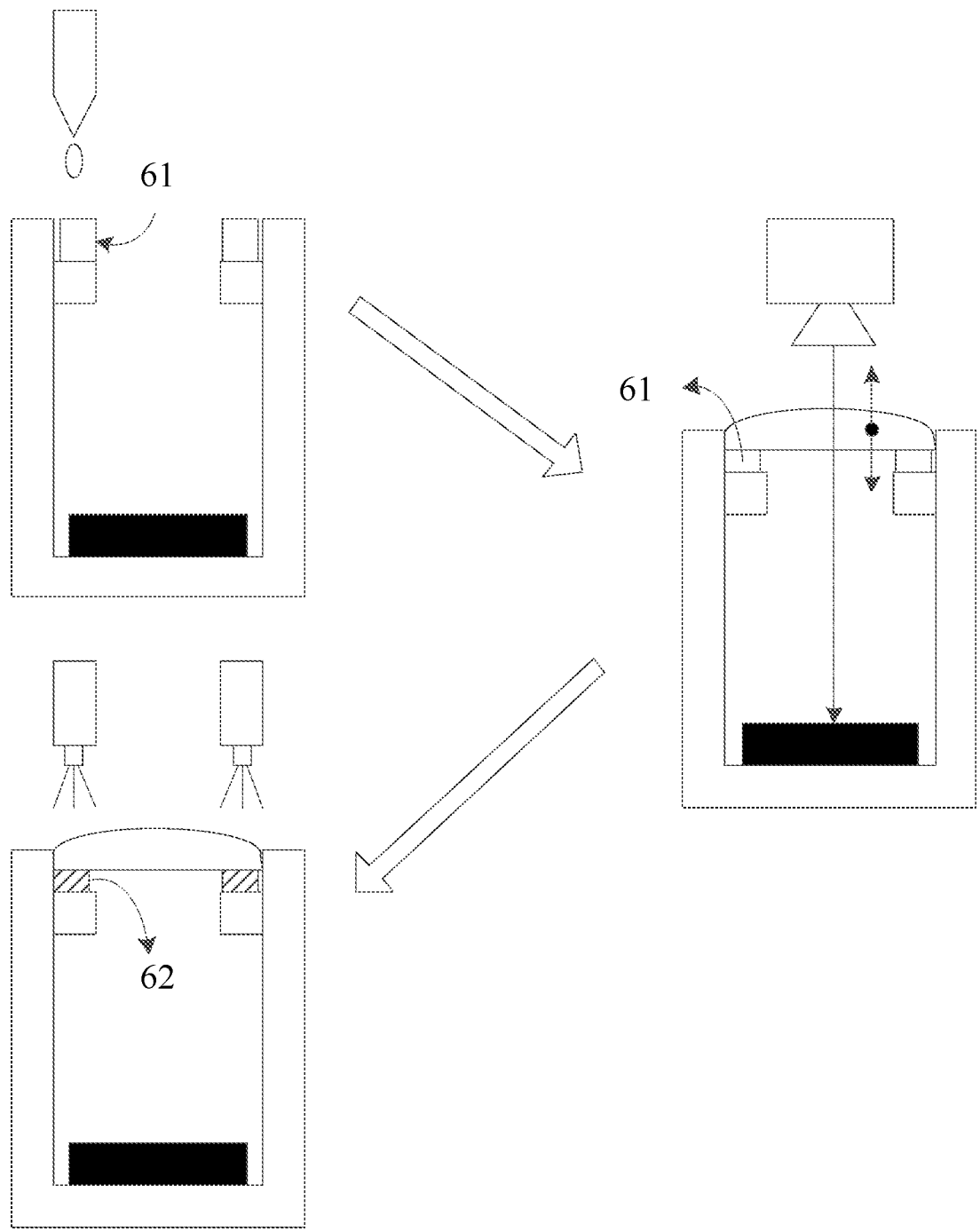
FIG. 6 shows a schematic diagram of an assembly procedure of another lens barrel according to the embodiment shown in FIG. 1.

For example, FIG. 6 is a schematic diagram of an assembly procedure of another lens barrel according to an embodiment of this application. The assembly procedure is a procedure of mounting a lens after a display screen has been mounted. As shown in FIG. 6, the procedure may be as follows:

Step 6a. After the display screen has been mounted on an inner side of a lens holder of a lens barrel housing of a device, control a third mechanical component to apply a sufficient amount of curing adhesive 61 on the outer side of the lens holder.

In some embodiments, to prevent a liquid curing adhesive from flowing to a lower position, during assembly, the assembly device may place the lens barrel with the bottom facing downward and the top facing upward. When assembling the lens, the assembly device first applies sufficient liquid curing adhesive on the outer side of the lens holder (that is, an upper surface of the lens holder).

Step 6b. Control a fourth mechanical component to grasp the lens, and place the lens onto the liquid curing adhesive 61.

Step 6c. Measure, by using an image acquisition unit through the lens, a virtual image distance between a virtual image displayed on the display screen and the image acquisition unit, and move, by using the fourth mechanical component, the lens, to adjust a position of the lens.

A method for measuring a virtual image distance is similar to that in FIG. 5. The curing adhesive at this moment is liquid, and does not affect movement of the lens. In this embodiment of this application, the controller can control the fourth mechanical component to grasp the lens and move the lens up and down.

Step 6d. When the measured virtual image distance satisfies a condition, control the third mechanical component to solidify the liquid curing adhesive 61 into a solid curing adhesive 62.

The controller may control, each time the fourth mechanical component moves the lens, the fourth mechanical component to measure a new VID by using the image acquisition unit; and when the measured VID satisfies a requirement, for example, an error between the measured VID and the target VID is within an allowed range, control the third mechanical component to solidify the curing adhesive. For example, when the curing adhesive is an ultraviolet curing adhesive, the controller may control the third mechanical component to irradiate the liquid curing adhesive by using ultraviolet light, so that the liquid curing adhesive is solidified, so as to fix a distance (that is, a BFL) between the lens and the display screen.

In conclusion, in the solution shown in this embodiment of this application, in the lens barrel of the virtual reality display device, a fill layer is provided between the lens and the lens holder for fixing the lens, so that a distance between the display screen and the lens is a target distance, and further, VIDs of virtual images displayed in left and right lens barrels of the virtual reality display device are as close as possible. In this way, the virtual images displayed in the left and right lens barrels can be more easily superposed and emerged, thereby improving the display effect of a three-dimensional visual scene in virtual reality.

Figure 7:
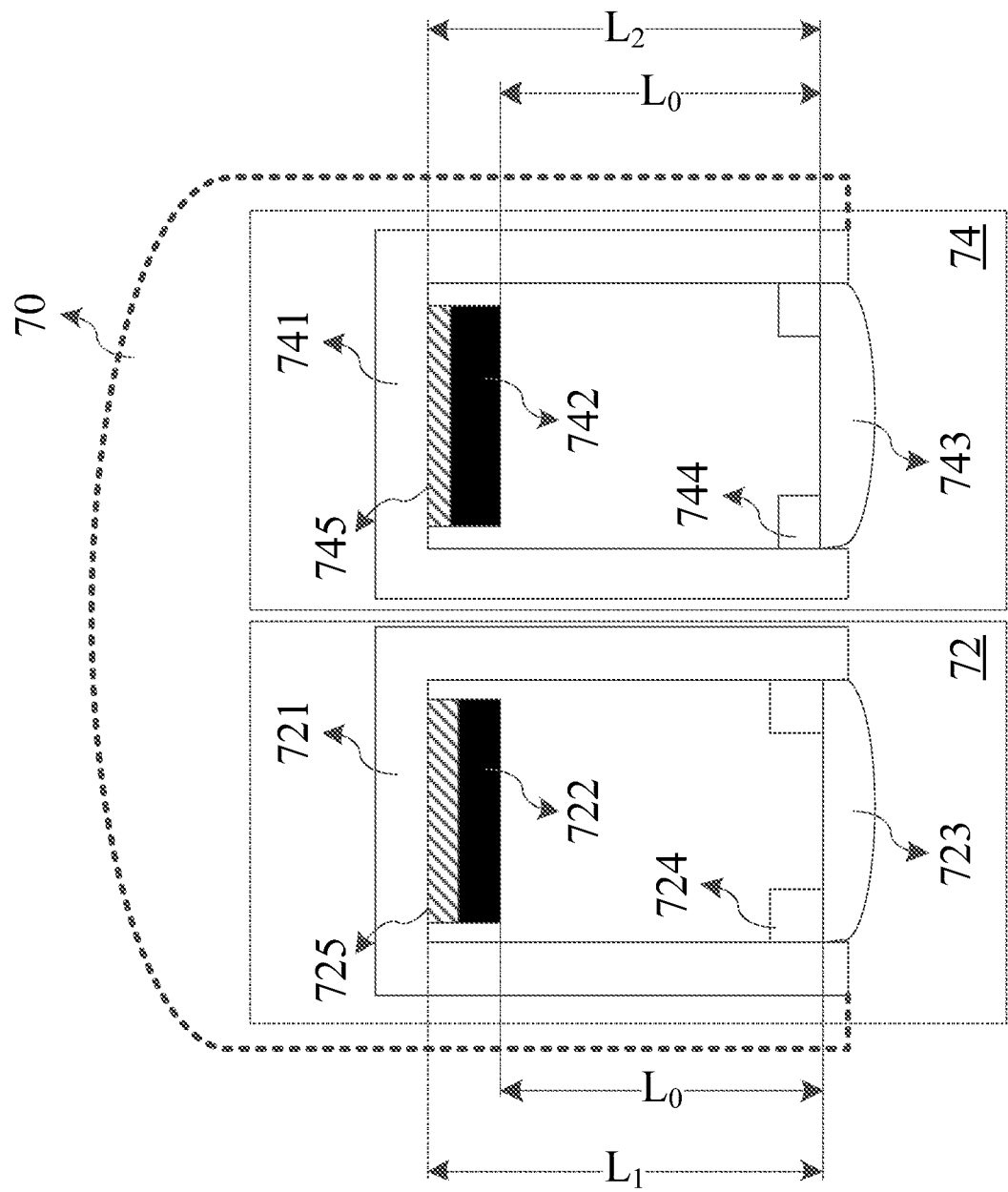
FIG. 7 shows a schematic structural diagram of a virtual reality display device according to an embodiment of this application.

FIG. 7 is a schematic structural diagram of a virtual reality display device according to an embodiment of this application. The virtual reality display device 70 includes: a left lens barrel 72 and a right lens barrel 74.

The left lens barrel 72 includes: a left lens barrel housing 721, a left display screen 722, and a left lens 723. The right lens barrel 74 includes: a right lens barrel housing 741, a right display screen 742, and a right lens 743.

An inner side of an opening portion of the left lens barrel housing 721 includes a left lens holder 724. An inner side of an opening portion of the right lens barrel housing 741 includes a right lens holder 744.

For a connection structure between the lens holder and the lens barrel and an arrangement manner of the lens holder, refer to FIG. 2 and FIG. 3. Details are not described herein again.

In this embodiment of this application, the display screen may be fixedly disposed at the bottom of the lens barrel housing, the lens is mounted at the opening portion of the lens barrel housing, and the lens holder is configured to hold the lens.

In FIG. 7, a left fill layer 725 is provided between the bottom of the left lens barrel housing 721 and the left display screen 722, and the left lens barrel housing 721, the left fill layer 725, and the left display screen 722 are adhered together consecutively; and a right fill layer 745 is provided between the bottom of the right lens barrel housing 741 and the right display screen 742, and the right lens barrel housing 741, the right fill layer 745, and the right display screen 742 are adhered together consecutively.

A sum of the thickness of the left fill layer 725 and the thickness of the left display screen 722 is a difference between a first distance $L_1$ and a target distance $L_0$. A sum of the thickness of the right fill layer 745 and the thickness of the right display screen 742 is a difference between a second distance $L_2$ and the target distance $L_0$. The first distance $L_1$ is a distance between the left lens 723 and the bottom of the left lens barrel housing 721. The second distance $L_2$ is a distance between the right lens 743 and the bottom of the right lens barrel housing 741.

In this embodiment of this application, the left fill layer 725 is configured to adjust a distance between the left display screen 722 and the left lens 723 to the target distance $L_0$, and the right fill layer 745 is configured to adjust a distance between the right display screen 742 and the right lens 743 to the same target distance $L_0$. After being filled by the fill layer, the distances between the display screens in the left and right lens barrels and the lenses are approximately the same target distance.

The thickness of a fill layer is set according to a distance between a lens and the bottom of a lens barrel housing after the lens has been mounted. Specifically, the thickness of the fill layer is a difference between a distance from a display screen to an upper surface of a lens holder and a standard BFL (that is, the target distance) minus the thickness of the display screen.

Correspondingly, for the virtual reality display device 70 in FIG. 7, the left fill layer 725 and the right fill layer 745 may have the same thickness or may have different thicknesses.

In some embodiments, the left fill layer 725 and/or the right fill layer 745 is a pad.

In this embodiment of this application, the fill layer between the lens holder and the lens may be a pad, and the pad may be made of a material such as metal or rubber. The pad is respectively adhered to the lens holder and the lens by using a curing adhesive or a double faced adhesive tape.

In some embodiments, the pad includes at least one sub-pad having a fixed thickness.

In some embodiments, the left fill layer 724 and/or the right fill layer 744 is a curing adhesive.

In another possible implementation, alternatively, a curing adhesive may be used as a fill layer. The curing adhesive is liquid in an initial state. The liquid curing adhesive may be solidified into a solid curing adhesive in some particular conditions. In this embodiment of this application, the curing adhesive may be an ultraviolet curing adhesive or a moisture curing adhesive.

In some embodiments, the curing adhesive may alternatively be another type of curing adhesive, for example, a visible light curing adhesive.

In conclusion, in the solution shown in this embodiment of this application, in the lens barrel of the virtual reality display device, a fill layer is provided between the bottom of the lens barrel housing and the display screen, so that a distance between the display screen and the lens is a target distance, and further, VIDs of virtual images displayed in left and right lens barrels of the virtual reality display device are as close as possible. In this way, the virtual images displayed in the left and right lens barrels can be more easily superposed and emerged, thereby improving the display effect of a three-dimensional visual scene in virtual reality.

Figure 8:
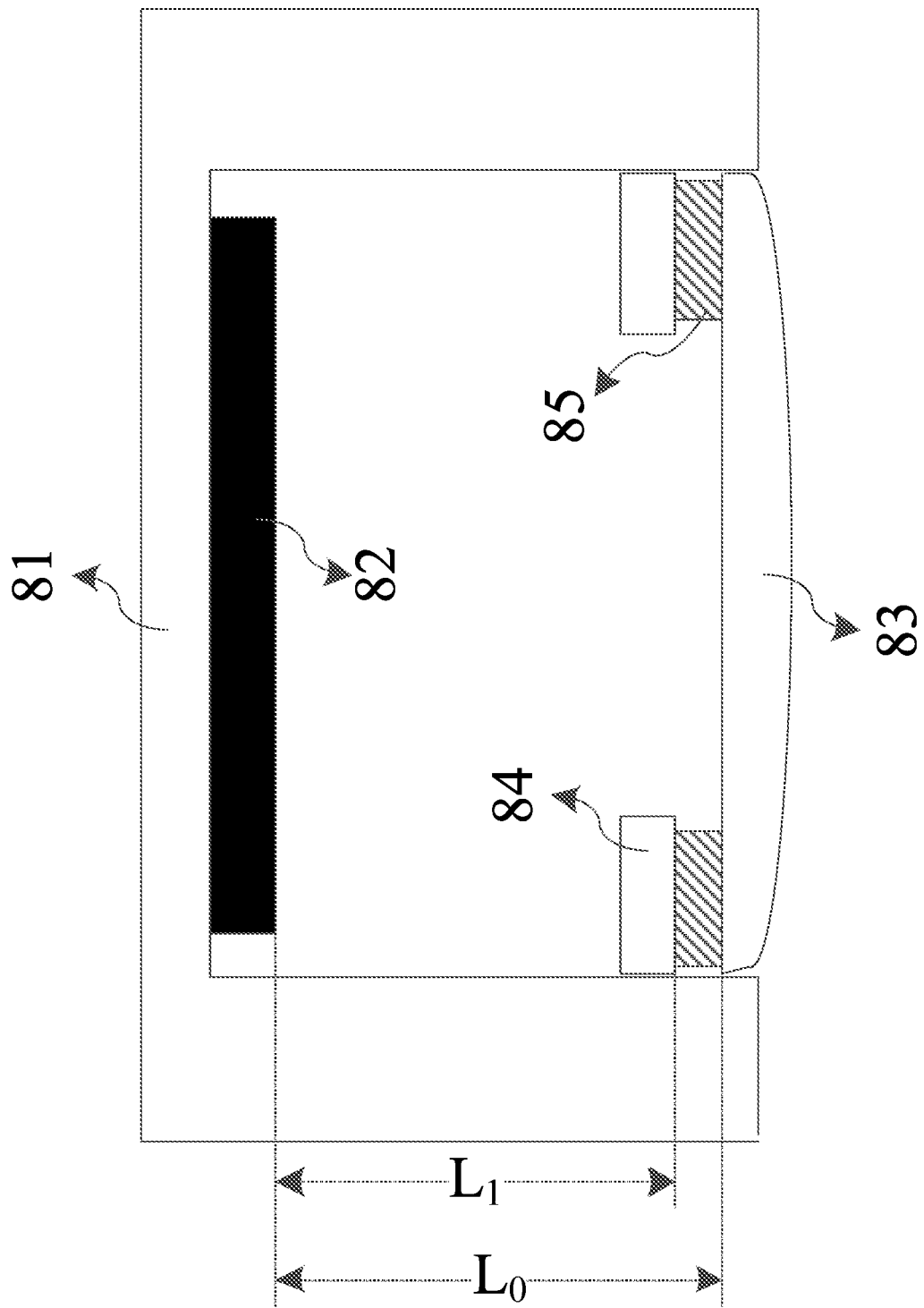
FIG. 8 shows a schematic structural diagram of a lens barrel in a virtual reality display device according to an embodiment of this application.

FIG. 8 is a schematic structural diagram of a lens barrel in a virtual reality display device according to an embodiment of this application. The lens barrel 80 may include a lens barrel housing 81, a display screen 82, and a lens 83.

An inner side of an opening portion of the lens barrel housing 81 includes a lens holder 84. The display screen 82 is mounted at the bottom of the lens barrel housing 81, the lens is mounted on a side of the lens holder 84 relative to an opening portion of the lens barrel housing 81, and the display screen 82 is parallel to the lens 83.

For structures of the lens holder 84 and the lens barrel housing 81, refer to FIG. 2 or FIG. 3. Details are not described herein again.

A fill layer 85 is provided between the lens holder 84 and the lens 83; and the lens holder 84, the fill layer 85, and the lens 83 are adhered together consecutively. The thickness of the fill layer 85 is a difference between a target distance $L_0$ and a first distance $L_1$, and the first distance $L_1$ is a distance between a surface of the lens holder 84 close to the opening portion of the lens barrel housing 81 and the display screen 82.

In some embodiments, the fill layer 85 is a pad.

In some embodiments, the pad includes at least one sub-pad having a fixed thickness.

In some embodiments, the fill layer 85 is a curing adhesive.

In some embodiments, the curing adhesive is an ultraviolet curing adhesive or a moisture curing adhesive.

For the fill layer 85, refer to the description in the embodiment shown in FIG. 1; for a method for assembling the fill layer 85, refer to FIG. 5 or FIG. 6; and details are not described herein again.

In this embodiment of this application, the lens barrel may be a part of the virtual reality display device. Specifically, for example, merchants can split the lens barrel and other components of the virtual reality display device for sale. After purchasing all components, including two lens barrels, required for one virtual reality display device, a user may assemble the virtual reality display device. Alternatively, in another possible scenario, if one of two lens barrels of a virtual reality display device owned by a user is damaged, the user can separately purchase a new lens barrel and replace the damaged lens barrel with the new lens barrel. Because in different lens barrels, after adjustment by fill layers, distances between display screens and lenses are all close to a target distance, VIDs of virtual images displayed in left lens barrels and right lens barrels after virtual reality display devices are assembled are approximately the same. In this case, virtual images displayed in each pair of left and right lens barrels can be more easily superposed and emerged, and the display effect is better.

Figure 9:
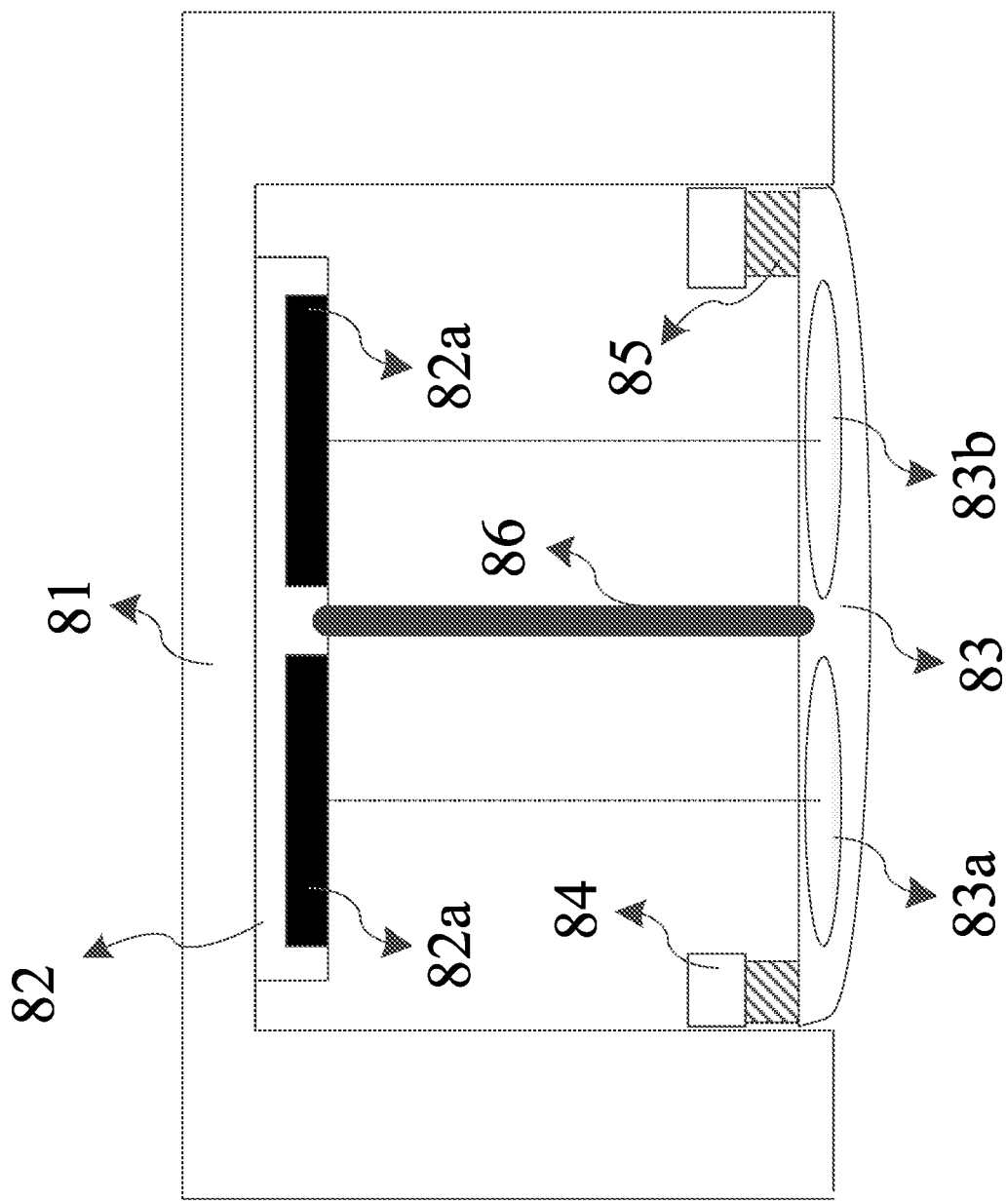
FIG. 9 shows another schematic structural diagram of the lens barrel of the virtual reality display device according to the embodiment shown in FIG. 8.

In some embodiments, FIG. 9 is another schematic structural diagram of the lens barrel of the virtual reality display device according to this embodiment of this application. In FIG. 9, the display area on the display screen 82 includes a left display area 82a and a right display area 82b; the lens 83 includes a left lens portion 83a and a right lens portion 83b; and the center of the left display area 82a exactly faces the center of the left lens portion 83a, and the center of the right display area 82b exactly faces the center of the right lens portion 83b.

In this embodiment of this application, a virtual image observed by the left eye of a user may be displayed on the same display screen. Correspondingly, lenses corresponding to the left eye and the right eye may be an integrated lens. During actual use, the left display area of the display screen displays a virtual image corresponding to the left eye of the user, and the right display area displays a virtual image corresponding to the right eye of the user. The left eye of the user observes, through the left lens portion, a virtual image displayed in the left display area, and the right eye observes, through the right lens portion, a virtual image displayed in the right display area. The virtual images respectively observed by the two eyes can achieve an effect of a three-dimensional visual scene after the virtual images are superposed and emerged.

In some embodiments, in FIG. 9, to ensure the display effect of the virtual images observed by the left and right eyes, the left and right display areas may be isolated. Specifically, the lens barrel housing 81 may further include an isolating layer 86. The isolating layer 86 is made of a non-light-transmissive material. One end of the isolating layer 86 is close to or clings to the center line between the left display area 82a and the right display area 82b, and the other end of the isolating layer 86 is close to or clings to the center line between the left lens portion 83a and the right lens portion 83b. In addition, two sides of the isolating layer 86 extend to the lens barrel housing 81.

In conclusion, in the solution shown in this embodiment of this application, in the lens barrel of the virtual reality display device, a fill layer is provided between the lens and the lens holder for fixing the lens, so that a distance between the display screen and the lens is a target distance, and further, VIDs of virtual images displayed in left and right lens barrels of the virtual reality display device are as close as possible. In this way, the virtual images displayed in the left and right lens barrels of the virtual reality display device can be more easily superposed and emerged, thereby improving the display effect of three-dimensional visual scene in virtual reality.

Figure 10:
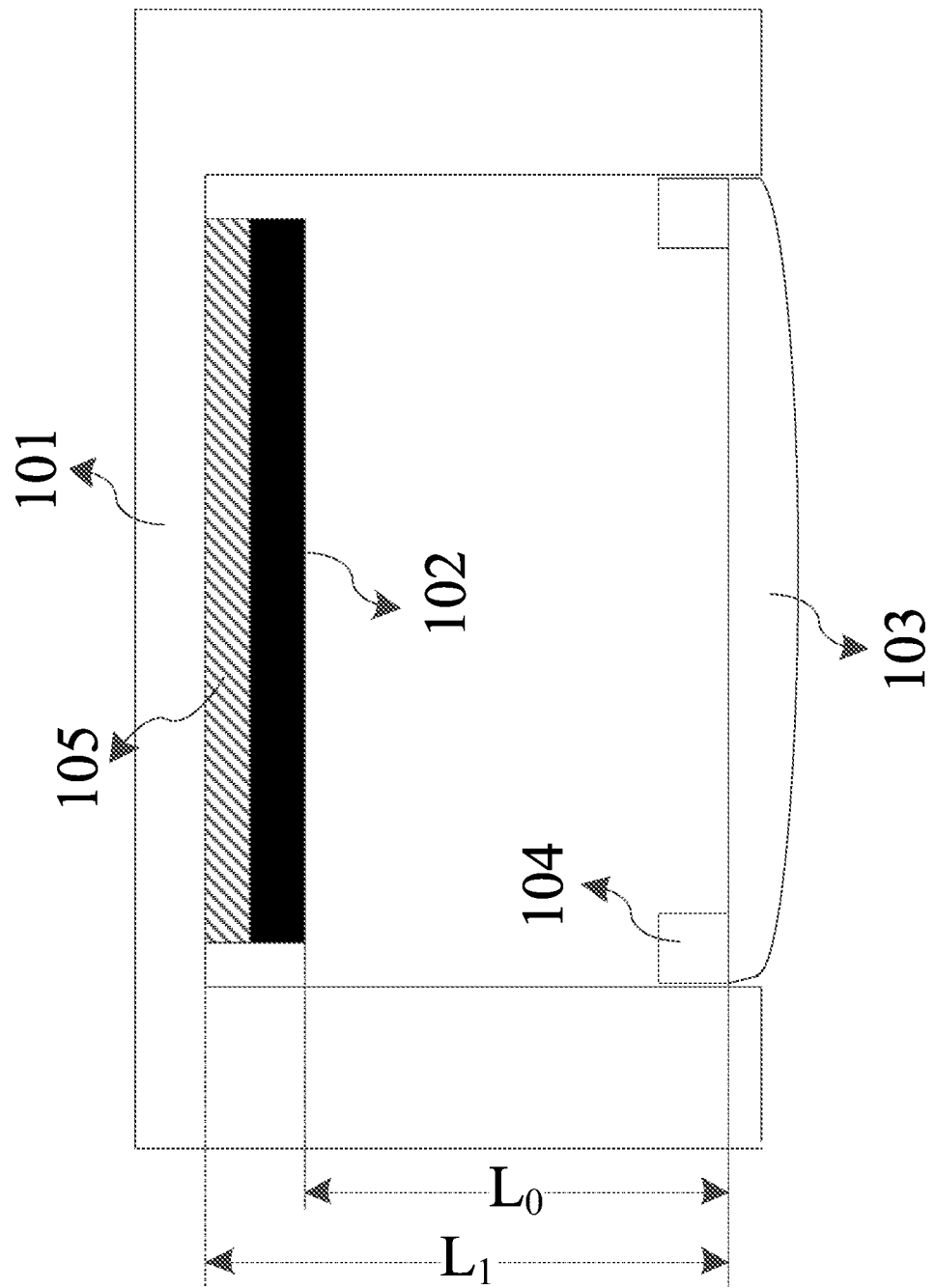
FIG. 10 shows a schematic structural diagram of a lens barrel in a virtual reality display device according to an embodiment of this application.

FIG. 10 is a schematic structural diagram of a lens barrel in a virtual reality display device according to an embodiment of this application. The lens barrel 100 may include a lens barrel housing 101, a display screen 102, and a lens 103.

An inner side of an opening portion of the lens barrel housing 101 includes a lens holder 104. The display screen 102 is mounted at the bottom of the lens barrel housing 101, the lens is mounted on a side of the lens holder 104 relative to an opening portion of the lens barrel housing 101, and the display screen 102 is parallel to the lens 103.

For structures of the lens holder 104 and the lens barrel housing 101, refer to FIG. 2 or FIG. 3. Details are not described herein again.

A fill layer 105 is provided between the lens holder 104 and the lens 103; and the lens holder 104, the fill layer 105, and the lens 103 are adhered together consecutively. A sum of the thickness of the fill layer 105 and the thickness of the display screen 102 is a difference between a target distance $L_0$ and a first distance $L_1$, and the first distance $L_1$ is a distance between a surface of the lens holder 104 close to the opening portion of the lens barrel housing 101 and the display screen 102.

In some embodiments, the fill layer 105 is a pad.

In some embodiments, the pad includes at least one sub-pad having a fixed thickness.

In some embodiments, the fill layer 105 is a curing adhesive.

In some embodiments, the curing adhesive is an ultraviolet curing adhesive or a moisture curing adhesive.

For the fill layer 105, refer to the description in the embodiment shown in FIG. 1. Details are not described herein again.

Figure 11:
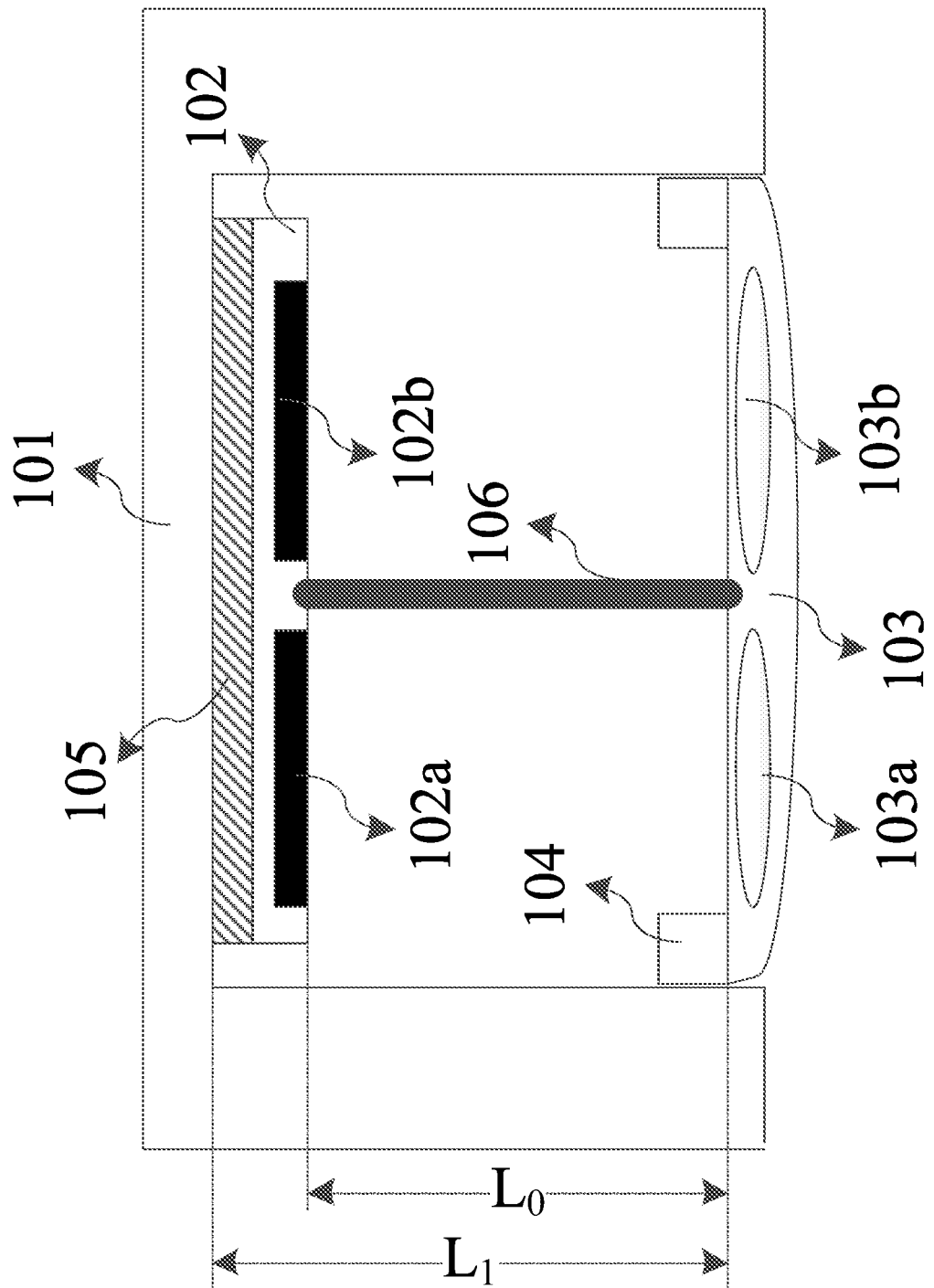
FIG. 11 shows another schematic structural diagram of the lens barrel of the virtual reality display device according to the embodiment shown in FIG. 10.

In some embodiments, FIG. 11 is another schematic structural diagram of the lens barrel of the virtual reality display device according to this embodiment of this application. In FIG. 11, the display area on the display screen 102 includes a left display area 102a and a right display area 102b; the lens 103 includes a left lens portion 103a and a right lens portion 103b; and the center of the left display area 102a exactly faces the center of the left lens portion 103a, and the center of the right display area 102b exactly faces the center of the right lens portion 103b.

In some embodiments, in FIG. 10, to ensure the display effect of the virtual images observed by the left and right eyes, the left and right display areas may be isolated. Specifically, the lens barrel housing 101 may further include an isolating layer 106. The isolating layer 106 is made of a non-light-transmissive material. One end of the isolating layer 106 is close to or clings to the center line between the left display area 102a and the right display area 102b, and the other end of the isolating layer 106 is close to or clings to the center line between the left lens portion 103a and the right lens portion 103b. In addition, two sides of the isolating layer 106 extend to the lens barrel housing 101.

In conclusion, in the solution shown in this embodiment of this application, in the lens barrel of the virtual reality display device, a fill layer is provided between the bottom of the lens barrel housing and the display screen, so that a distance between the display screen and the lens is a target distance, and further, VIDs of virtual images displayed in left and right lens barrels of the virtual reality display device are as close as possible. In this way, the virtual images displayed in the left and right lens barrels of the virtual reality display device can be more easily superposed and emerged, thereby improving the display effect of a three-dimensional visual scene in virtual reality.

Figure 12:
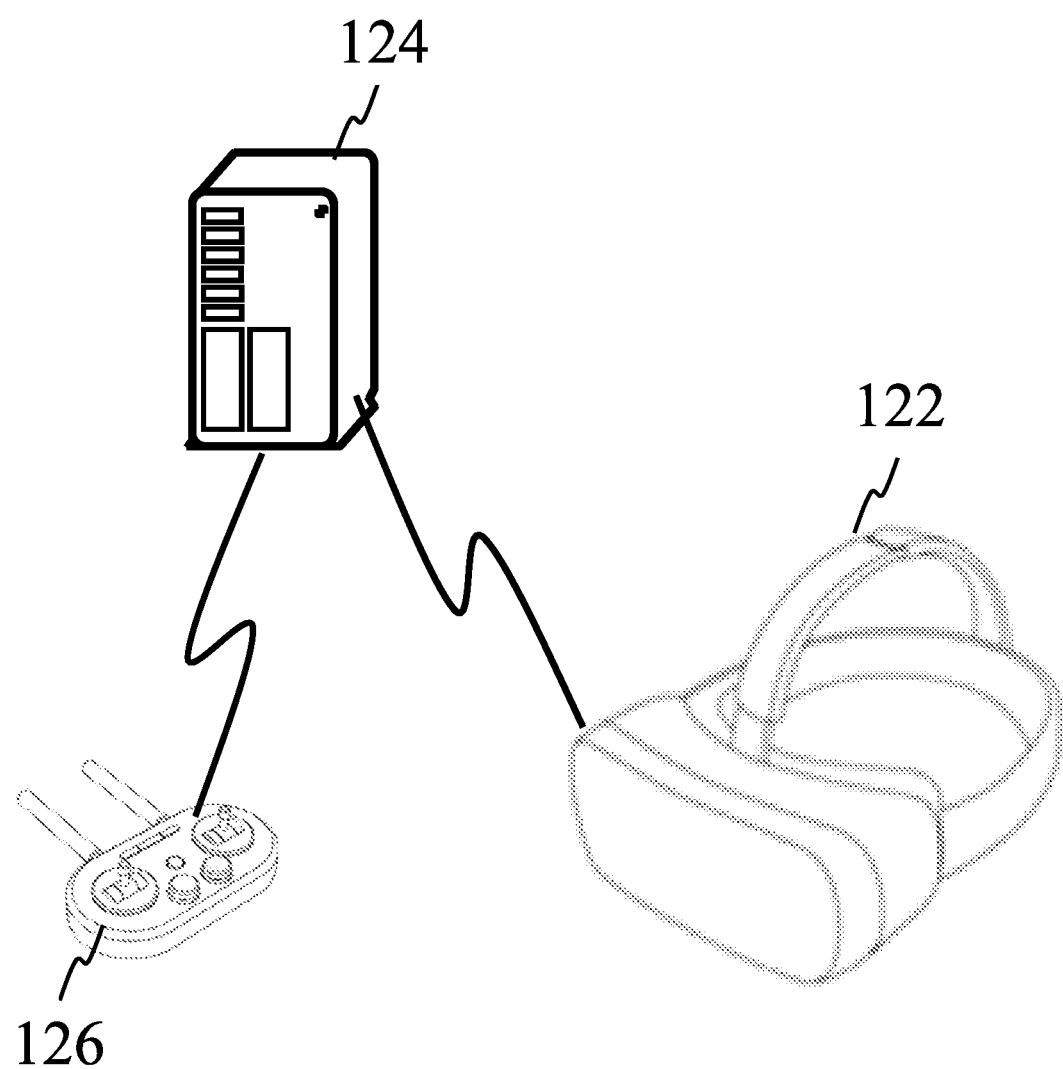
FIG. 12 shows a schematic structural diagram of a virtual reality system according to an embodiment of this application.

FIG. 12 is a schematic structural diagram of a VR system according to an embodiment of this application. The VR system includes a virtual reality display device 122.

The virtual reality display device 122 may be the virtual reality display device shown in FIG. 1 or FIG. 7.

In some embodiments, the VR system may further include a virtual reality host 124 and an input device 126.

The virtual reality display device 122, the virtual reality host 124, and the input device 126 may be devices independent of each other; or two of the virtual reality display device 122, the virtual reality host 124, and the input device 126 may be integrated into a same device, and the remaining device is an independent device; or the virtual reality display device 122, the virtual reality host 124, and the input device 126 may be integrated into a same device.

Optionally, the virtual reality display device 122 may further be provided with a motion sensor, configured to capture an action of a portion (for example, the head) of a user wearing the virtual reality display device 122, so that the virtual reality host 124 changes a display picture in the virtual reality display device 122.

In some embodiments, the virtual reality display device 122 is electrically connected to the virtual reality host 124 through a flexible circuit board, a hardware interface, a data line, or a wireless network. The virtual reality host 124 is connected to the input device 126 through a cable, a Bluetooth connection, or a wireless fidelity (Wi-Fi) connection.

The virtual reality host 124 is configured to: model a three-dimensional virtual environment, generate a three-dimensional display picture corresponding to the three-dimensional virtual environment, generate a virtual object in the three-dimensional virtual environment, and so on. Certainly, the virtual reality host 124 may also model a two-dimensional virtual environment, generate a two-dimensional display picture corresponding to the two-dimensional virtual environment, and generate a virtual object in the two-dimensional virtual environment; or the virtual reality host 124 may model a three-dimensional virtual environment, generate, according to a position of an angle of view of a user, a two-dimensional display picture corresponding to the three-dimensional virtual environment, generate a two-dimensional projection picture of a virtual object in the three-dimensional virtual environment, and so on. This is not limited in this embodiment.

The virtual reality host 124 receives an input signal of the input device 126, and generates a display picture of the virtual reality display device 122 according to the input signal. The virtual reality host 124 is usually implemented by electronic components such as a processor, a memory, and an image virtual reality host that are disposed on a circuit board. Optionally, the virtual reality host 124 further includes an image acquisition apparatus.

The input device 126 may be at least one external input device of a somatosensory glove, a somatosensory handset, a remote control, a treadmill, a mouse, a keyboard, and an eye focus device.

A person skilled in the art upon consideration of the specification and practice of this application disclosed herein will readily appreciate other embodiments of this application. This application is intended to cover any variations, uses, or adaptations of the embodiments of this application, and the variations, uses, or adaptations follow a general principle of the embodiments of this application and include common sense or common technical means in this technical field that are not disclosed in the embodiments of this application. The specification and the embodiments are merely exemplary, and the actual scope and spirit of the embodiments of this application are subject to the following claims.

It should be understood that the embodiments of this application are not limited to the foregoing described precise structures shown in the accompanying drawings, but may be modified and changed without departing from the scope of the embodiments of this application. The scope of the embodiments of this application is merely limited by the appended claims.

What is claimed is:

1. A lens barrel of a virtual reality display device, comprising: a lens barrel housing, a display screen, and a lens;
   an inner side of an opening portion of the lens barrel housing comprising a lens holder, the display screen being mounted at a bottom of the lens barrel housing, the lens being mounted on one side of the lens holder close to the opening portion of the lens barrel housing, and the display screen being parallel to the lens;
   a fill layer being provided between the lens and the lens holder, and the lens, the fill layer, and the lens holder being adhered together consecutively; and
   a thickness of the fill layer being a difference between a first distance and a target distance, the target distance being a predefined back focus length of the lens barrel and the first distance being a distance between a surface of the lens holder close to the opening portion of the lens barrel and the display screen.

2. The lens barrel according to claim 1, wherein the fill layer is a pad.

3. The lens barrel according to claim 2, wherein the pad comprises at least one sub-pad having a fixed thickness.

4. The lens barrel according to claim 1, wherein the fill layer is made of a curing adhesive.

5. The lens barrel according to claim 4, wherein the curing adhesive is an ultraviolet curing adhesive or a moisture curing adhesive.

6. The lens barrel according to claim 1, wherein a display area on the display screen comprises a left display area and a right display area; and the lens comprises a left lens portion and a right lens portion; and
   a center of the left display area exactly faces a center of the left lens portion, and a center of the right display area exactly faces a center of the right lens portion.

7. The lens barrel according to claim 6, wherein the lens barrel housing further comprises a nontransparent isolating layer;
   a bottom of the nontransparent isolating layer is close to or clings to a center line between the left display area and the right display area;
   a top of the nontransparent isolating layer is close to or clings to a center line between the left lens portion and the right lens portion; and
   two sides of the nontransparent isolating layer extend to the lens barrel housing.

8. A virtual reality system, comprising:
   a virtual reality display device comprising a left lens barrel and a right lens barrel each according to claim 1.

9. The virtual reality system according to claim 8, wherein the preset target distance is determined according to a preset virtual image distance, and the preset virtual image distance is a distance between a virtual image displayed on a display screen and an eye of a user.

10. The virtual reality system according to claim 8, wherein
    the fill layer of the left lens barrel and the fill layer of the right lens barrel have different thicknesses.

11. The virtual reality system according to claim 8, wherein the fill layer of the left lens barrel and the fill layer of the right lens barrel have the same thickness.

* * * * *